United States Patent [19]
Kopp

[11] 3,708,256
[45] Jan. 2, 1973

[54] EXTRUSION PRESS
[75] Inventor: Eugen Kopp, Stuttgart, Germany
[73] Assignee: Werner & Pfleiderer, Stuttgart-Feuerbach, Germany
[22] Filed: Aug. 6, 1970
[21] Appl. No.: 61,711

[30] Foreign Application Priority Data

Aug. 16, 1969 Germany..................P 19 41 872.5

[52] U.S. Cl. ...................425/376, 264/245, 425/132
[51] Int. Cl. ................................................B29f 3/014
[58] Field of Search.18/12 DR, 12 P, 30 GQ, 30 GR, 18/30 FJ; 25/15, 17 C; 425/152, 344, 376, 382, 261, 166, 256; 264/323, 245

[56] References Cited

UNITED STATES PATENTS

| | | | |
|---|---|---|---|
| 2,477,258 | 7/1949 | MacMillan | 18/30 FJ |
| 3,461,515 | 8/1969 | Cornberg | 18/12 P X |
| 2,491,343 | 12/1949 | Valyi | 18/12 P X |
| 2,366,417 | 1/1945 | MacMillin | 18/12 P |
| 2,617,169 | 11/1952 | Bodkin | 18/12 P X |
| 2,597,638 | 5/1952 | Higbie | 18/12 P |

Primary Examiner—J. Spencer Overholser
Assistant Examiner—B. D. Tobor
Attorney—Hane, Baxley & Spiecens

[57] ABSTRACT

An upright extrusion press for extruding an extrudable mass such as a plasticized and/or pulverized mass includes a pressing table mounting an extrusion die and at least two pressure or extrusion pots jointly swingable about a common vertical axis for alternately moving the pots into a filling position and an extrusion position, respectively. Each of the pots comprises an extrusion bottom including an opening which is so disposed that it is in registry with the extrusion opening in the die when the pot is in its extrusion position.

17 Claims, 5 Drawing Figures

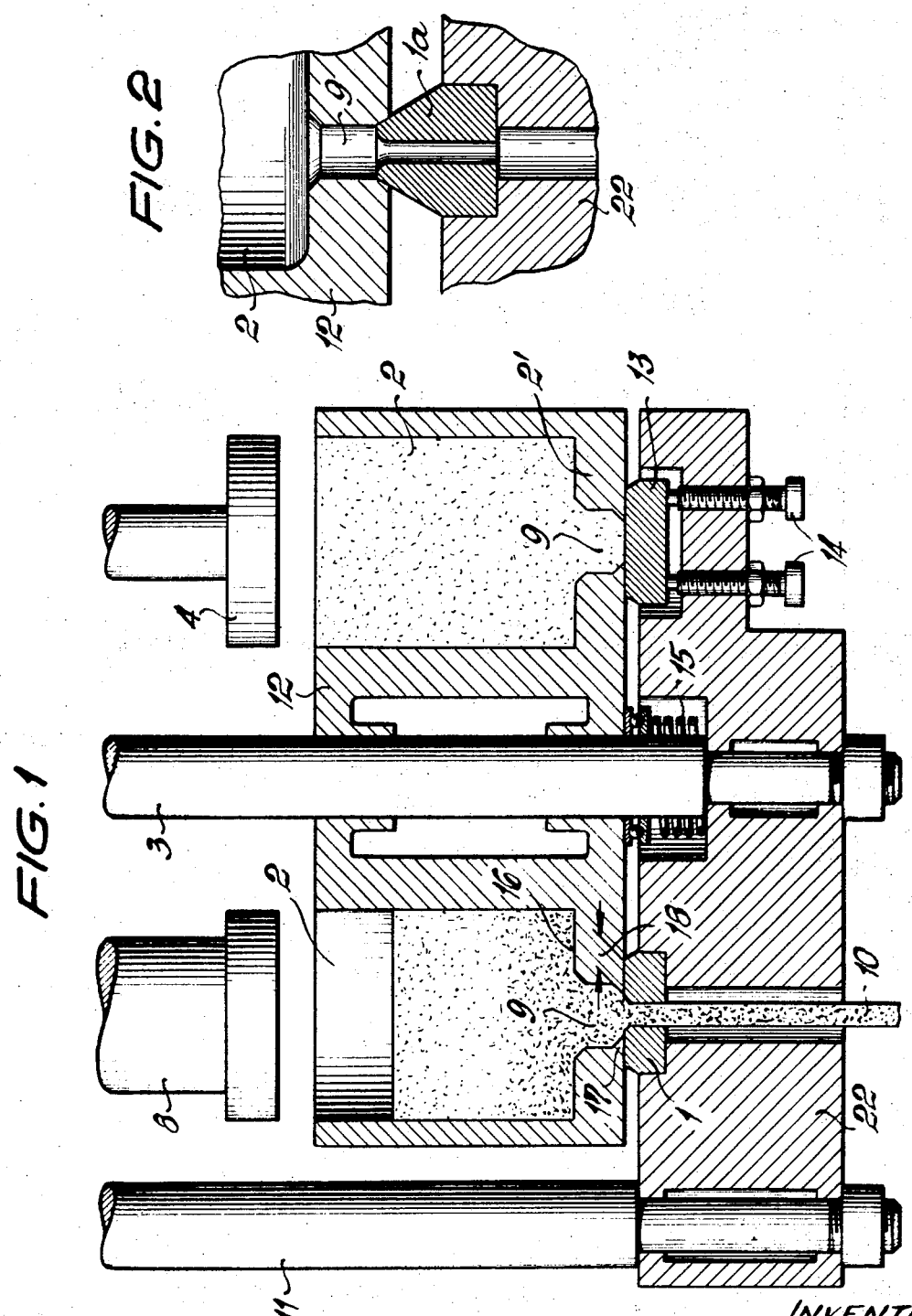

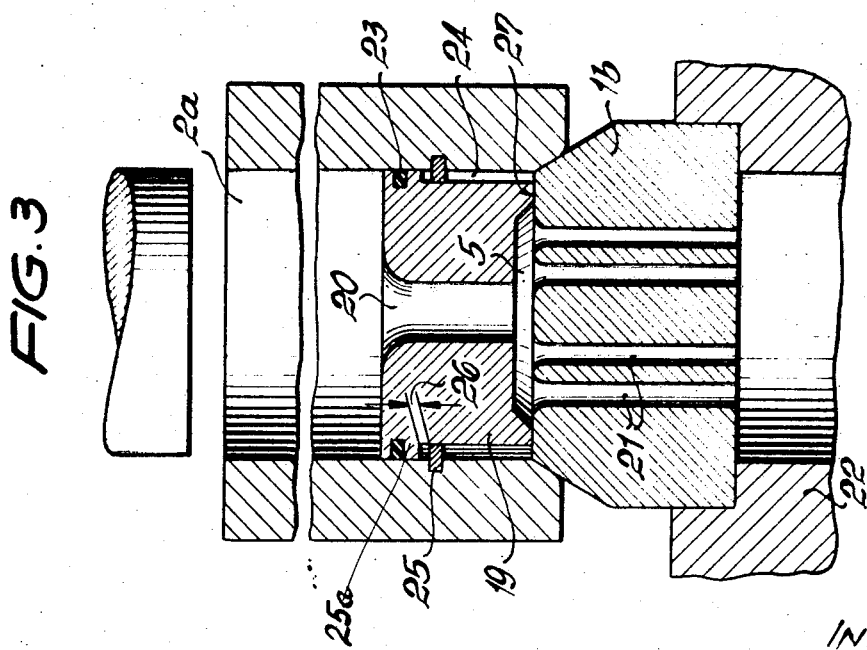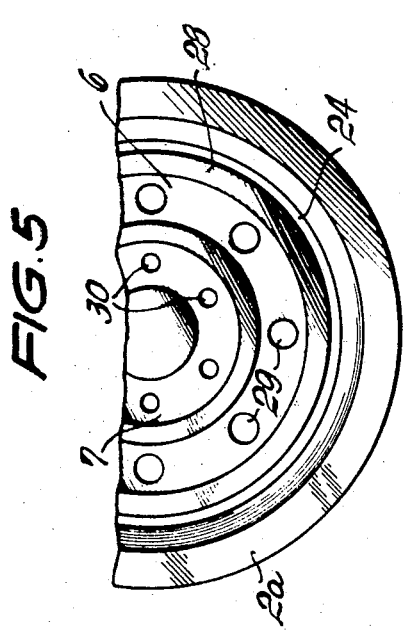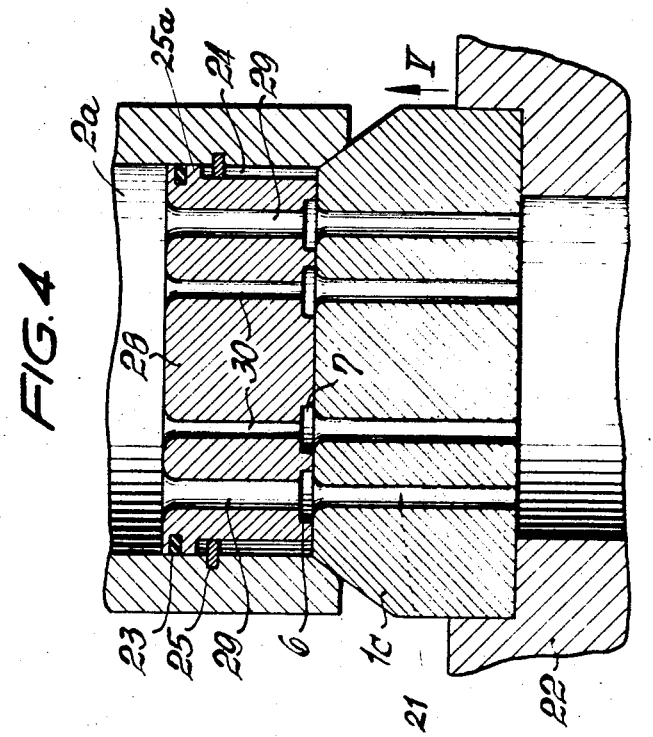

EXTRUSION PRESS

The invention relates to an extrusion press for extruding a mass of extrudable consistency such as a plasticized and/or pulverized mass and more particularly to an upright extrusion of this kind with an extrusion die mounted in a pressing table and two or more pressure or extrusion pots which are swingable relative to the die and parallel to their axes about a common vertical pivot axis for alternately moving the pots into an extrusion position and a filling position, respectively.

BACKGROUND

With extrusion presses of the general kind above referred to, the mass is extruded in the form of a strand or any other profile as controlled by the die from a pot in the extrusion position while a pot in the filling position is being charged with the mass; if desired the mass in the pot in the filling position can be pre-compressed by means suitable and known for the purpose. After charging a pot in the filling position the filled pot is moved into the extrusion position while the pot which is now empty by extruding the mass therein is moved into the filling position. As is evident, such an arrangement permits rapid and consecutive extrusion operations. As it is also evident, the principle of swinging pots about a common axis can be extended to more than one filling position and extrusion position.

Multiple extrusion presses of the above referred to type as now known have several disadvantages. The bottom opening of the pots is as large as the cross sectional area of the space within the pot or in other words, the pots constitute an open ended tube. Accordingly, mass filled into such pots is retained therein merely by adhesion of the mass to the inner wall of the pots. Reliance on such inherent adhesion of the mass is, at best, acceptable only if the mass is of highly viscous consistency. In practice it has been found that even with a mass of this kind there is a tendency of the mass to slide, at least partly, out of the pots especially when and while the same are being swung from the filling station into the extrusion station. Moreover, an often desirable pre-compression of the mass is rarely, if ever, possible to the desired extent without dislodging of the mass. As it is evident, downward sagging of the mass interferes with a smooth progress of the extrusion operation; it causes loss of time and may also result in damage to the press.

The afore pointed out disadvantage of presses as just described is particularly pronounced when the masses to be extruded have inherently a low friction coefficient.

There are also known multiple extrusion presses in which the total area of the bottom opening of the swingable pots, which as previously stated is usually equal to the entire cross sectional area of the pot, is covered by an extrusion die mounted in the pots themselves or suspended from the bottom side of the pots. Assemblages of this kind require extremely expensive extrusion dies. Moreover, they are in conflict with a general demand in the industry that for operational reasons the extrusion dies should be mounted on the pressing table itself. In other words, presses of the kind just described while theoretically possible are not satisfactory for practical purposes.

THE INVENTION

It is a broad object of the present invention to provide a novel and improved upright extrusion press of the general kind above referred to which permits swinging of the pressure or extrusion pots from a filling station to an extrusion station without danger of escape of the mass to be extruded even though the friction coefficient thereof may be comparatively low.

Another important object of the invention is to provide a novel and improved upright extrusion press of the general kind above referred to which permits simultaneous extrusion of the mass through several die openings without danger of substantial pressure differentials in the openings as the mass passes through the same. Obviously, such pressure differentials would result in variations in the density and other properties of the extruded strands or other profiles.

SUMMARY OF THE INVENTION

The afore pointed out objects, features and advantages and other objects, features and advantages which will be pointed out hereinafter are obtained by providing in the pressure or protrusion pots apertured bottoms which automatically prevent premature escape of the mass from the pots. The bottoms are preferably so mounted in the pots that they can be axially displaced therein within selected limits.

The invention also provides that the passage opening for the mass in each bottom is centrally located and in registry with the die when the respective pot is in the extrusion position and that the cross sectional area of the openings in the bottoms is larger than the cross sectional area of the extrusion passage in the die so that the cross section of the bottom opening cannot interfere with the smooth operation of the die and thus affect the cross sectional configuration of a strand or other profile emerging from the die.

According to another aspect of the invention the extrusion bottom includes several openings. In such arrangement, the die must, of course, have several passages so that a plurality of strands or other profiles can be simultaneously extruded.

The afore pointed out vertical adjustability of the extrusion bottoms in the pots themselves has among others, the important advantage that even when the pressure or extrusion pots and the pressure bottoms therein have a large cross section sealing of the pots against the die during the extrusion, operation is obtained and that a smooth uniform flow of the mass to be extruded is assured.

According to another aspect of the invention the same advantage is obtained by providing in the side of the bottom facing the die a recess defining a pressure equalizing space which is disposed concentrically with reference to the opening in the bottom and so arranged that when a pot is in its extrusion position, that is, when the opening in the bottom is in registry with the die mounted on the pressing table, the recess is sealed off along its entire outer periphery.

According to a further exemplification of the invention which is especially advantageous for large cross sections of pressure or extrusion pots and correspondingly large pressure bottoms, the afore referred to equalizing space is subdivided into circularly disposed annular spaces of different diameters and sealed off against each other, each of said recesses communicating with openings in the bottom and the die. These annular recesses are preferably so dimensioned that the diameters thereof decrease toward the center of the bottom, that is, that the recesses having the largest diameter are nearest to the outer rim of the bottom whereas the recess with the smallest diameter is nearest to the center of the bottom. The openings through the bottom and the die, which issue into the recesses as stated, have advantageously also different diameters. It has been found that by providing such an arrangement of the openings and the recesses different velocities of the mass flows at the outlets of the die are effectively avoided even when the pressure bottoms are of large size.

The invention also contemplates that the lower rims of the openings through the pressure bottoms and/or the edges defining the equalizing spaces are sharp edged so that they act as cutters and thus automatically cut off the strands or other profiles as the pots are being moved from the extrusion position toward the filling position.

According to the invention, it is also advantageous to provide additional means for preventing escape of the mass from the pots. These means are in the form of closure plates which abut against the openings through the pressure bottoms when the pots are in the filling position. These closure plates are preferably displaceable and adjustable so that they can be correctly located depending upon the location of the openings in the bottoms.

DETAILED DESCRIPTION OF THE INVENTION

In the accompanying drawing several embodiments of the invention are shown by way of illustration and not by way of limitation.

In the drawing:

FIG. 1 is an elevational diagrammatic view, partly in section, of an extrusion press according to the invention;

FIG. 2 is a fragmentary elevational view of the press according to FIG. 1 but with a modified die;

FIG. 3 is an elevational diagrammatic view of the press according to FIG. 1 but modified with respect to the pressure bottom and the die;

FIG. 4 is an elevational view showing a further modification of the pressure bottom and the die of the press; and FIG. 5 is a plan view upon FIG. 3 seen in the direction of arrow V.

Referring now to the figures more in detail and first to the extrusion press as exemplified in FIG. 1, the press according to this figure comprises a pressing table 22 in which an extrusion die 1 is fixedly mounted. This die should be visualized as being conventional and may have any desired passage therethrough. Two pressure or extrusion pots 2 of equal structure are swingable about a vertical column 3 as a common pivot axis. The left hand pressure pot is shown in its extrusion position and the right hand pot in its filling position, that is, in the position in which it is being filled with the mass to be extruded. A plunger 4 serves to pre-compress the mass in the pot in the filling position.

While only two pots are shown, it is readily apparent that the concept of the invention also encompasses an arrangement with more than two pressure or extrusion pots and more than one filling position or station and one extrusion position or station.

The extrusion station includes a ram 8 which can be lowered and raised in a conventional manner by devices suitable for the purpose (not shown). Lowering of the ram into the left hand pot 2 extrudes the mass therein through an opening or nozzle 9 in a pressure bottom 2' integral with the die in the form of a strand 10. The mass emerges from the die in the form of a strand 10. The figure shows the mass partly extruded and ram 8 lifted above pot 2. This position has been selected for clarity of illustration; it reflects an interrupted extrusion operation which will rarely occur in practice.

The pressing table 22 with the components mounted thereon is suspended by tie bars 11 or other suitable means on the head assembly (not shown) of the press. A frame structure 12 supports both pots and is journalled on column or shaft 3.

Opening 9 in extrusion or pressure bottom 2' may be closed off by a closure plate 13 when the pot is in its filling position (right hand pot). Set screws 14 or other suitable adjustment means secure the closure plate in a selected position. The pot in the filling position can be charged with the mass to be extruded by simply pouring the mass into the pot. The initially very loose mass may then be pre-compressed by means of plunger 4 as previously described, or if preferred, the pot can be evacuated prior to the extrusion.

As it is shown in FIG. 1 the pot assembly is up and down slidable on column or shaft 3 by suitable lifting means but for the extrusion and filling operations it is lowered into the position of FIG. 1 against the action of a spring 15 so that the pots to be extruded or filled are in sealing engagement with die 1 and closure plate 13, respectively.

The coacting sealing surfaces on the bottom of the respective die and the die may be plane as shown in FIG. 1 but a conical sealing surface can also be provided as it is illustrated in FIG. 2 which shows a conically shaped die 1a.

In the event plane surfaces are used as sealing surfaces, lips 17 are preferably provided at the lower edge of opening 9. These lips as they are exposed to the mass pressure, improve the sealing. They preferably end in a sharp edge so that they act as cutters which automatically and smoothly cut strand 10 when the left hand pot is moved toward the filling position.

When and while the mass is extruded from the pot in the filling position, the specific extrusion pressure exerts upon the upwardly facing annular surface area 16 of bottom 2' a pressure which presses the pot against die 1 so that a sealing between the pot and the die is automatically obtained. The existing sealing pressure may be expressed by the equation:

$$F1 \cdot p/F2 \geqq 2p$$

where $F1$ is the annular area 16 of bottom 2', $p$ the specific extrusion pressure and $F2$ an annular surface area 18 of the die.

The concept of the invention is, of course, also applicable to extrusion presses with dies for simultaneous extrusion of several strands or other selected profiles.

FIG. 3 shows a press of this kind. A pressure bottom 19 is axially displaceable within a pressure or extrusion pot 2a. The bottom has a central passage opening or nozzle 20 through which the mass is pressed into a pressure equalizing space defined by a recess 5 formed in the side of the bottom facing a die 1b. This die has four passages 21 each communicating with the equalizing space. As it is evident, four strands will be simultaneously extruded. To obtain a ratio between surface areas $F1$ and $F2$ (as previously defined) which is favorable for the quality of the sealing, a sealing ring 23 in bottom 19 prevents creeping of mass from the space in the pot above bottom 19 into an annular space 24. A ring 26 within this space and retained in the inner wall of pot 2a in an axial fixed position, as it is clearly shown in FIG. 3 and also in FIG. 4, prevents a downward sliding of bottom 19 out of pot 2a when and while a pot is moving between a filling station and an extrusion station. Moreover, ring 25 in conjunction with a shoulder 25a limits lifting of the bottom within the pot to the distance 26. Such upward displacement of the bottom relative to the pot occurs in the extrusion station when the pot is lowered upon the die by means of the afore mentioned lifting means thereby assuring that the annular surface 27 of the die which in FIG. 3 represents the afore defined sealing surface $F2$ is engaged with pressure engagement by the bottom thereby preventing outward creeping of the mass.

FIGS. 4 and 5 show an extrusion press in which the die 1c and the pressure bottom 28 both have several passage openings 29 and 30, respectively. As it is shown, the passage openings 29 have a larger diameter than the passage opening 30 and in FIG. 5 it is further shown that the passage openings 29 and 30 are disposed in two concentric circles. The circle including passage openings 29 is the one disposed closer to the peripheral outside of bottom 28. More than two such concentric circles and correspondingly differently dimensioned passage openings 29 and 30 may be provided in bottom 28, and, of course, in such case corresponding passage openings 21 must also be provided in die 1c. Each of the passage openings 29 communicates with an annular recess 6 which constitutes a pressure equalizing space for all passage openings 29. Similarly, all passage openings 30 communicate with annular recess 7 which constitutes a pressure equalizing space for all openings 30. As is evident, recess 6 is larger than recess 7. Die openings 21 communicate with recesses 6 and 7 as shown.

Mass when passing through the narrower passage openings 30 into the smaller space 7 will experience more friction than mass passing through openings into larger space 6. Accordingly, there is a higher pressure drop for the mass entering space 7 than for the mass entering space 6 and such differential pressure drop is intended and utilized.

By suitably correlating the diameters of openings 29 and 20 a uniform mass pressure in both spaces 6 and 7 can be obtained which, in turn, results in a substantial uniform velocity of the strands at the discharge ends of die 1c.

The afore described steps for obtaining a substantially uniform exit flow velocity of the strands is advantageous, especially with pressure bottoms of large diameters. With such large bottoms the flow velocity of the strands at or near the middle of the die has been found to be higher than the velocity of the strands leaving the die closer to the inner wall of the pressure pot, these differences in the exit velocities of the strands from the middle of the die toward the rim thereof can be graphically shown as a parabolic curve. This velocity differential is presumably due to the fact that the friction between the moving mass and the inner wall of the supply container for the mass — such as the pressure or extrusion pot in an extrusion press — causes a loss of energy which decreases toward the middle of the mass.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An extrusion molding press comprising in combination:
   a pressing table having at least one extrusion opening therethrough;
   at least two substantially alike pressure pots open at one end and closed at the other end by a bottom wall, said bottom wall having at least one extrusion nozzle therethrough and facing the pressing table parallel thereto;
   a frame structure mounting said pressure pots in spaced apart relationship;
   a pivot means disposed intermediate said pressure pots and supporting the frame structure and thus the pressure pots pivotal about an axis normal to the pressing table for selectively pivoting either one of the pressure pots into a first position in which said extrusion nozzle is in registry with the table opening or into a second position in which the extrusion nozzle is out of registry with the table opening, said first position constituting an extrusion position and the second position a filling position respectively for the pressure pots; and
   a pressure means movable into and out of a pressure pot in the extrusion position for compacting and extruding mass contained in said pot.

2. The extrusion press according to claim 1 wherein each of said bottom walls is axially displaceable with the respective pressure pot.

3. The extrusion press according to claim 2 wherein limit means limit axial displacement of the bottom walls within the pressure pots.

4. The extrusion press according to claim 1 wherein the nozzle in each of said bottom walls is centrally located and has a peripheral outline larger than the peripheral outline of an extrusion opening in the pressing plate through which the mass is to be extruded.

5. The extrusion press according to claim 1 wherein a die is fitted in the extrusion opening in the pressing table, said die including two or more extrusion openings for simultaneously extruding mass through said die openings, and each of said bottom walls has in its face side facing the die when the respective pressure pot is in the extrusion position, a recess into which issue the die openings, said recess defining an extrusion pressure equalizing space.

6. The extrusion press according to claim 5 wherein wall portions of said bottom walls bounding said recess are in sealing engagement with the die when the respective pressure pot is in its extrusion position.

7. The extrusion press according to claim 6 wherein each of said bottom walls includes two or more nozzles, said nozzles being disposed in the bottom in concentric circles.

8. The extrusion press according to claim 7 wherein said nozzles have cross sectional areas different one from another, each of said circles including nozzles of equal cross sectional area.

9. The extrusion press according to claim 8 wherein each of said bottom walls has in its side facing the die for each of said circles an annular recess, each of said recesses being concentrically disposed with one of the circles of nozzles and defining an extrusion pressure equalizing space for the nozzles communicating with the respective recess when one of the pressure pots is in the extrusion position.

10. The extrusion press according to claim 9 wherein said nozzles and the respective recesses are disposed so that the cross sectional areas of the nozzles decrease in inward direction.

11. The extrusion press according to claim 10 wherein the wall portions of the bottom walls bounding said annular recesses are in sealing engagement with the die when the respective pressure pot is in its extrusion position.

12. The extrusion press according to claim 6 wherein the peripheral edge of said recess defines a cutting edge for cutting mass at said edge when the respective pressure pot is being pivoted toward the filling position.

13. The extrusion press according to claim 1 wherein the nozzle in each bottom wall defines at its lower end an edge for cutting mass at said edge when the respective pressure pot is being swung toward the filling position.

14. The extrusion press according to claim 1 and comprising a second pressure means movable into and out of a pressure pot in the filling position for preliminarily compressing mass contained in said pot.

15. The extrusion press according to claim 1 wherein said frame structure is displaceable on the pivot means in the direction for displacing the bottom walls of the pressure pots into and out of sealing engagement with the pressing table.

16. The extrusion press according to claim 15 and comprising a closure plate on the side of the pressure table facing the pot, said closure plate being disposed to be in registry with the extrusion nozzle of a pressure pot pivoted into the filling position.

17. The extrusion press according to claim 15 and comprising spring means biasing the frame structure and thus the two pressure pots out of said sealing position with the pressing table.

* * * * *